(12) United States Patent
Itsuji et al.

(10) Patent No.: US 11,367,218 B2
(45) Date of Patent: Jun. 21, 2022

(54) CALCULATION SYSTEM AND CALCULATION METHOD

(71) Applicant: HITACHI, LTD., Tokyo (JP)

(72) Inventors: Hiroaki Itsuji, Tokyo (JP); Takumi Uezono, Tokyo (JP); Tadanobu Toba, Tokyo (JP); Kenichi Shimbo, Tokyo (JP); Yutaka Uematsu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 56 days.

(21) Appl. No.: 17/102,778

(22) Filed: Nov. 24, 2020

(65) Prior Publication Data

US 2021/0166422 A1 Jun. 3, 2021

(30) Foreign Application Priority Data

Nov. 28, 2019 (JP) .............................. JP2019-215457

(51) Int. Cl.
*G06K 9/00* (2022.01)
*G06T 7/73* (2017.01)
*G06T 7/77* (2017.01)
*G06V 20/58* (2022.01)
*G06V 20/56* (2022.01)

(52) U.S. Cl.
CPC .................. *G06T 7/74* (2017.01); *G06T 7/77* (2017.01); *G06V 20/58* (2022.01); *G06V 20/588* (2022.01); *G06T 2207/30261* (2013.01)

(58) Field of Classification Search
CPC ... G06T 7/74; G06T 7/77; G06T 2207/30261; G06V 20/58; G06V 20/588; G06V 10/95; G06V 20/52; G06V 20/56; G06K 9/6264
See application file for complete search history.

(56) References Cited

U.S. PATENT DOCUMENTS

| | | | |
|---|---|---|---|
| 10,969,237 B1* | 4/2021 | Zhang | G06V 20/56 |
| 11,105,638 B2* | 8/2021 | Jin | G01C 21/32 |
| 2018/0188037 A1 | 7/2018 | Wheeler et al. | |
| 2020/0209401 A1 | 7/2020 | Motoyama et al. | |
| 2021/0073570 A1* | 3/2021 | Yang | G06T 7/74 |
| 2021/0182596 A1* | 6/2021 | Adams | G06V 10/462 |

FOREIGN PATENT DOCUMENTS

JP 2019-028861 A 2/2019

OTHER PUBLICATIONS

Extended European Search Report dated Apr. 23, 2021 for European Patent Application No. 20209645.9.

* cited by examiner

*Primary Examiner* — Dhaval V Patel
(74) *Attorney, Agent, or Firm* — Volpe Koenig

(57) ABSTRACT

To detect a discrimination error in a type of an object. A calculation system includes a first device and a second device. The first device includes: a first object map generation unit configured to calculate, using first image information that is image information acquired by the first device, a first object map indicating a type of an object and a position of the object; and a first communication unit configured to transmit the first object map to the second device. The second device includes: a second object map generation unit configured to calculate, using second image information that is image information acquired by the second device, a second object map indicating a type of an object and a position of the object; and a comparison unit configured to compare the first object map and the second object map.

7 Claims, 15 Drawing Sheets

[FIG. 1]
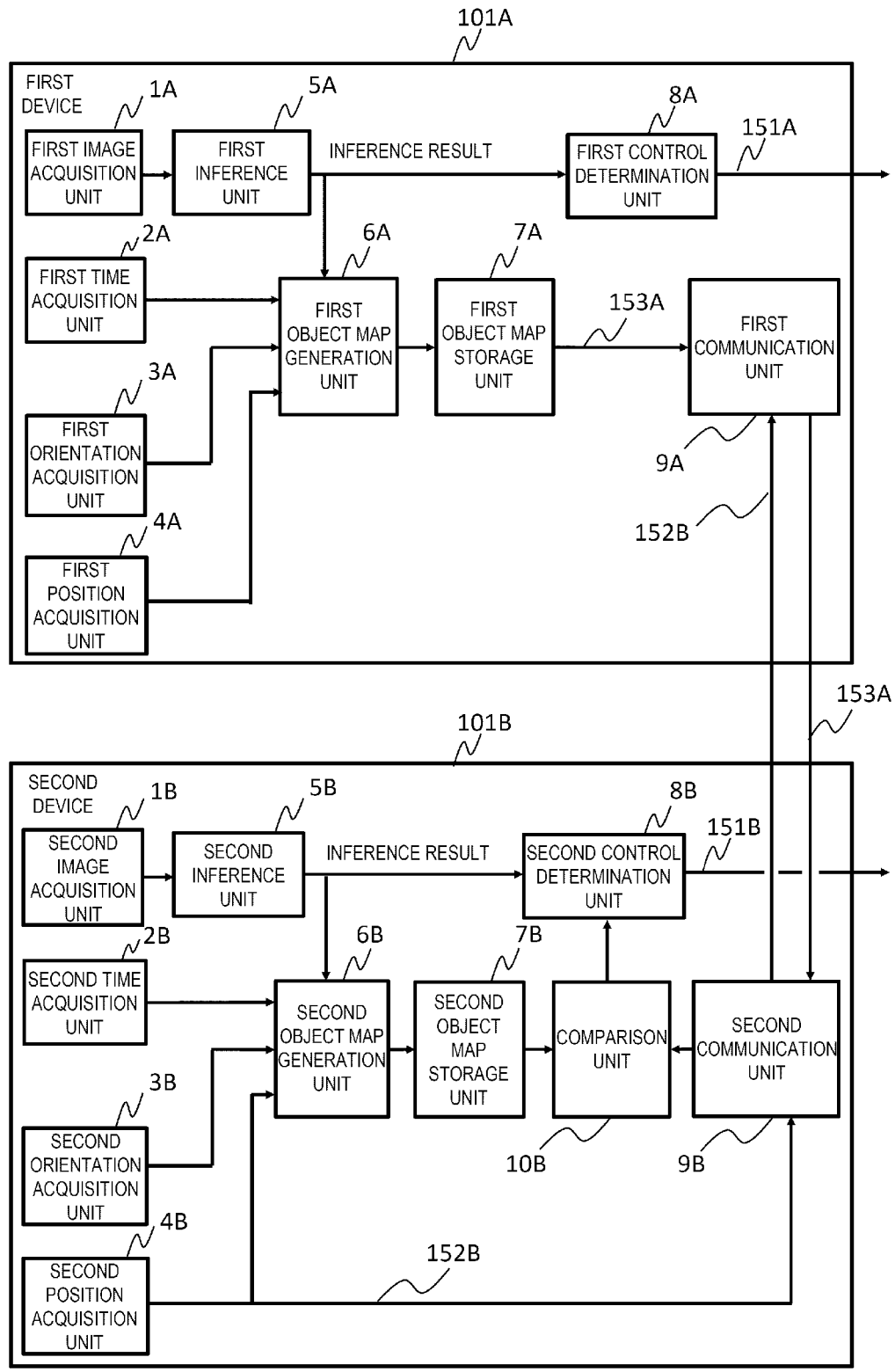

[FIG. 2]

| TIME | POSITION OF CAMERA | ORIENTATION INFORMATION OF CAMERA | OBJECT MAP INFORMATION |
|---|---|---|---|
| $t_1$ | $(x_{c1}, y_{c1}, z_{c1})$ | $\theta_1$ | OBJECT MAP 1 |
| $t_2$ | $(x_{c2}, y_{c2}, z_{c2})$ | $\theta_2$ | OBJECT MAP 2 |
| $t_3$ | $(x_{c3}, y_{c3}, z_{c3})$ | $\theta_3$ | OBJECT MAP 3 |

[FIG. 3]

| TIME | OBJECT POSITION | OBJECT TYPE | COMPARISON RESULT |
|---|---|---|---|
| $t_1$ | $(x_1, y_1, z_1)$ | PEDESTRIAN | NOT COMPARED |
| | $(x_{1a}, y_{1a}, z_{1a})$ | VEHICLE | MATCHED |
| $t_2$ | $(x_2, y_2, z_2)$ | VEHICLE | MISMATCHED |
| | $(x_{2a}, y_{2a}, z_{2a})$ | PEDESTRIAN | MATCHED |
| $t_3$ | $(x_3, y_3, z_3)$ | VEHICLE | MISMATCHED |
| | $(x_{3a}, y_{3a}, z_{3a})$ | PEDESTRIAN | MATCHED |
| | $(x_{3b}, y_{3b}, z_{3b})$ | BIRD | NOT COMPARED |

OBJECT MAP

[FIG. 4]
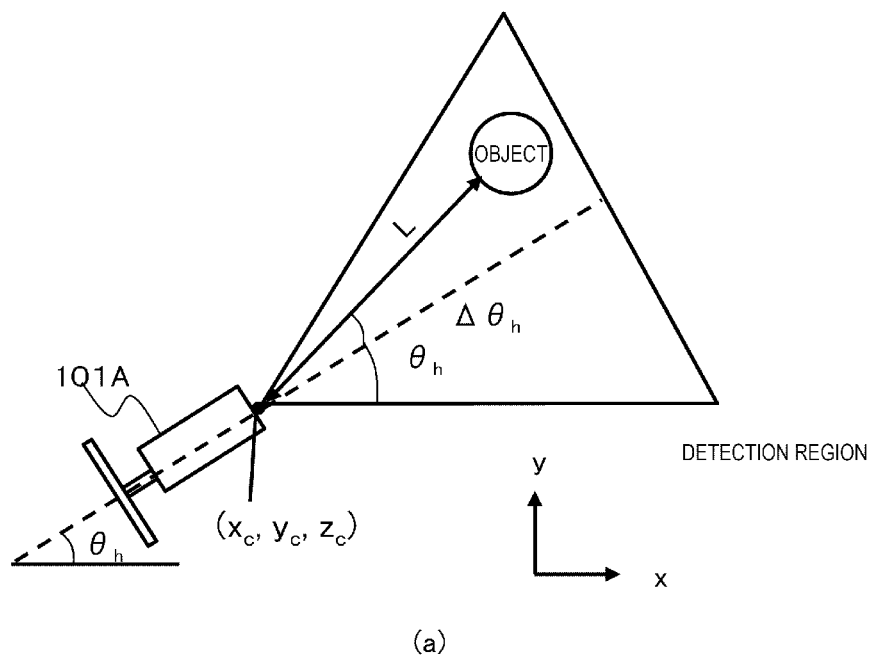
(a)
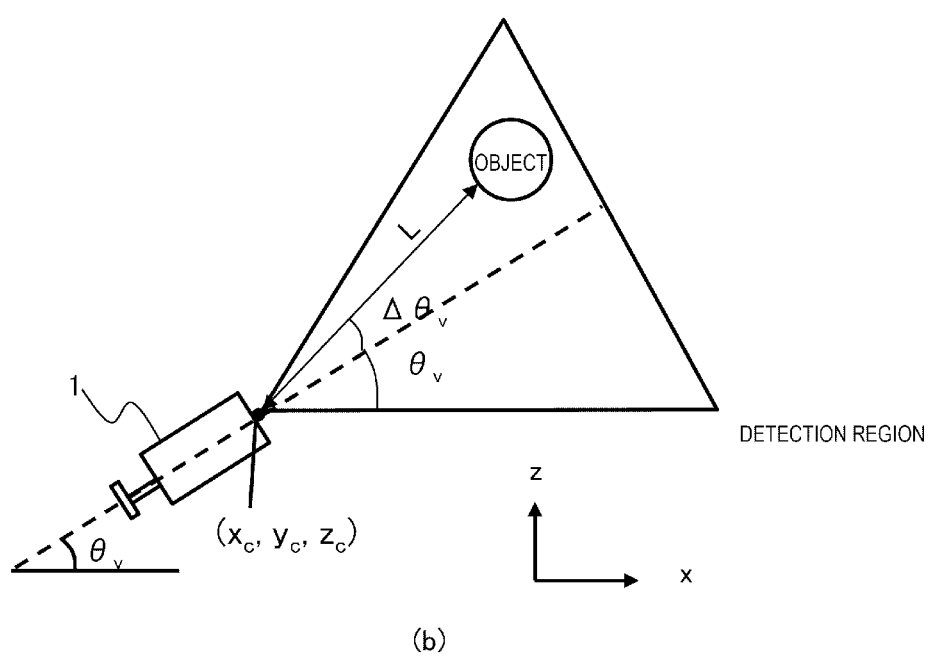
(b)

[FIG. 5]
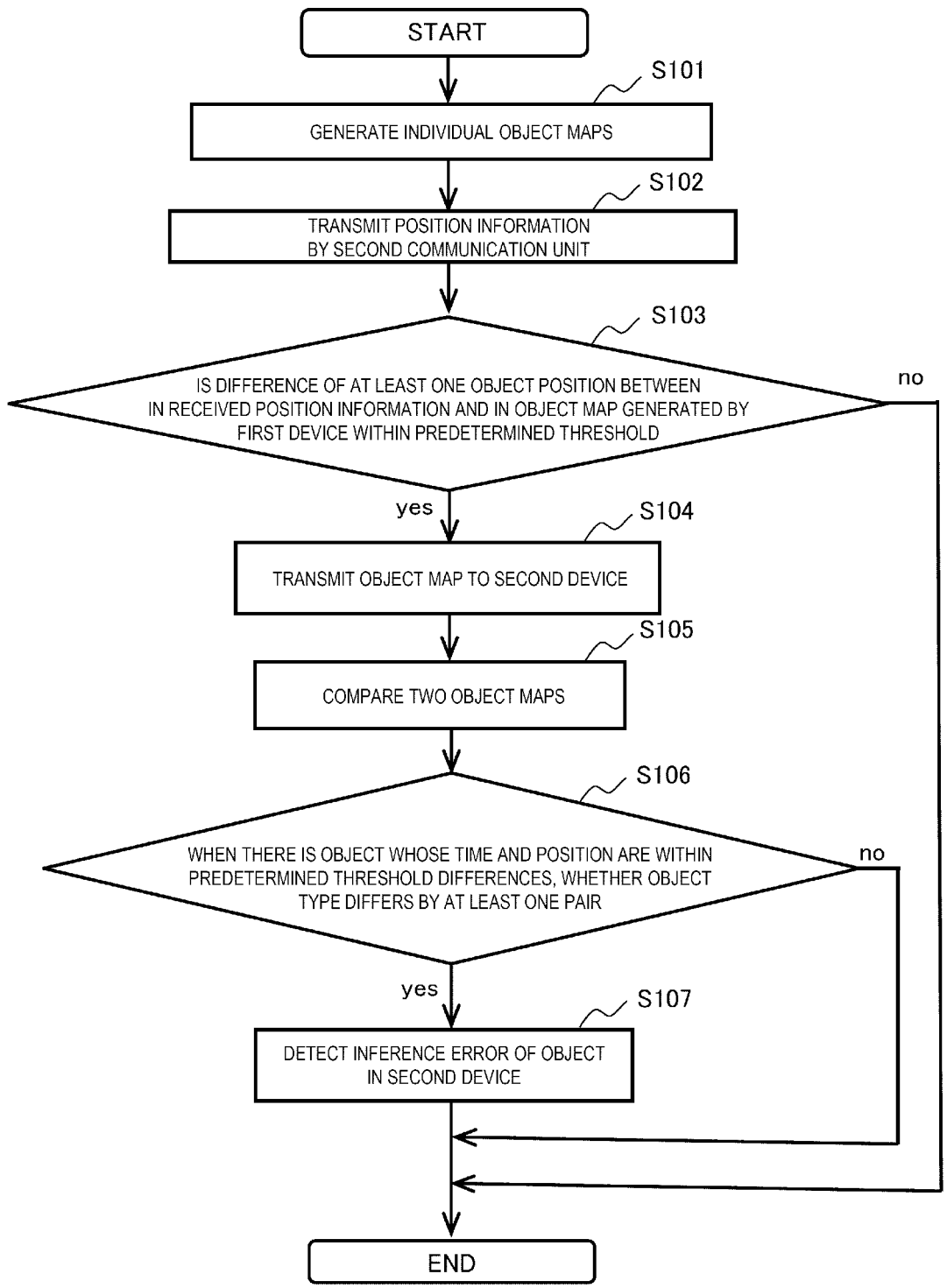

[FIG. 6]
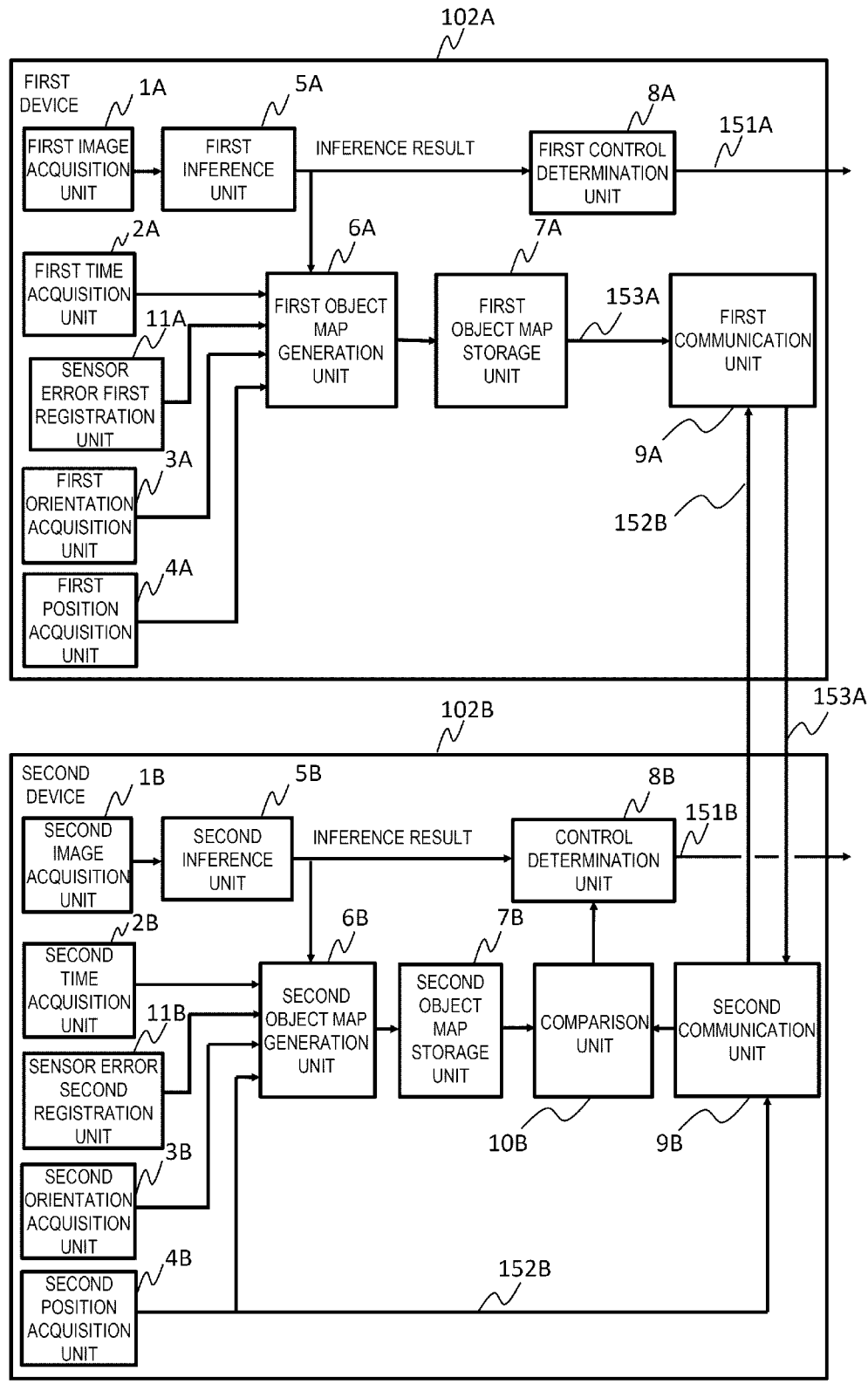

[FIG. 7]

| TIME | OBJECT POSITION | OBJECT POSITION ERROR | OBJECT TYPE |
|---|---|---|---|
| $t_1$ | $(x_1, y_1, z_1)$ | $(\Delta \pm x_1, \pm \Delta y_1, \pm \Delta z_1)$ | PEDESTRIAN |
| | $(x_{1a}, y_{1a}, z_{1a})$ | $(\Delta \pm x_{1a}, \pm \Delta y_{1a}, \pm \Delta z_{1a})$ | VEHICLE |
| $t_2$ | $(x_2, y_2, z_2)$ | $(\Delta \pm x_2, \pm \Delta y_2, \pm \Delta z_2)$ | VEHICLE |
| | $(x_{2a}, y_{2a}, z_{2a})$ | $(\Delta \pm x_{2a}, \pm \Delta y_{2a}, \pm \Delta z_{2a})$ | PEDESTRIAN |
| $t_3$ | $(x_3, y_3, z_3)$ | $(\Delta \pm x_3, \pm \Delta y_3, \pm \Delta z_3)$ | VEHICLE |
| | $(x_{3a}, y_{3a}, z_{3a})$ | $(\Delta \pm x_{3a}, \pm \Delta y_{3a}, \pm \Delta z_{3a})$ | PEDESTRIAN |
| | $(x_{3b}, y_{3b}, z_{3b})$ | $(\Delta \pm x_{3b}, \pm \Delta y_{3b}, \pm \Delta z_{3b})$ | BIRD |

[FIG. 8]
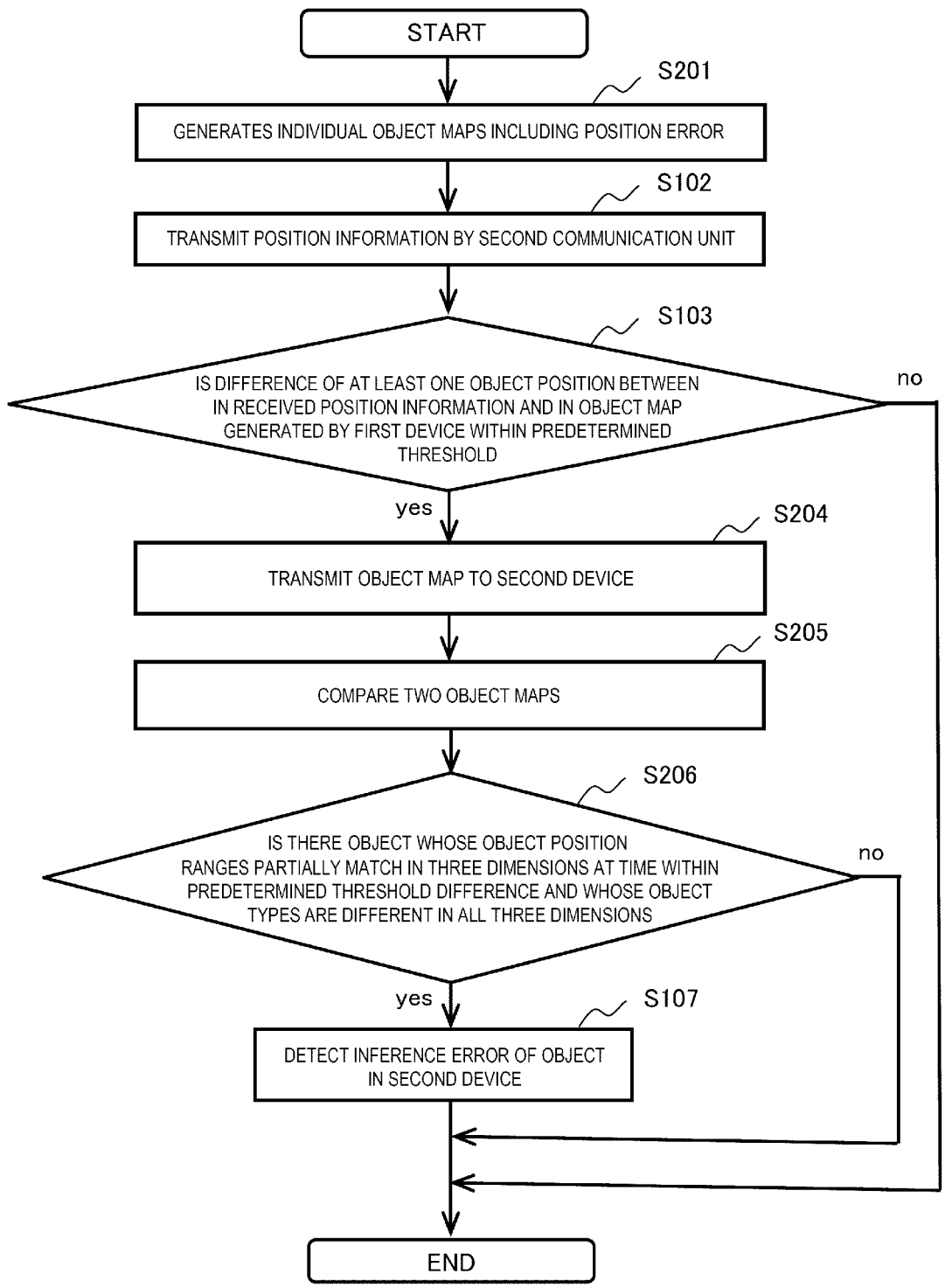

[FIG. 9]
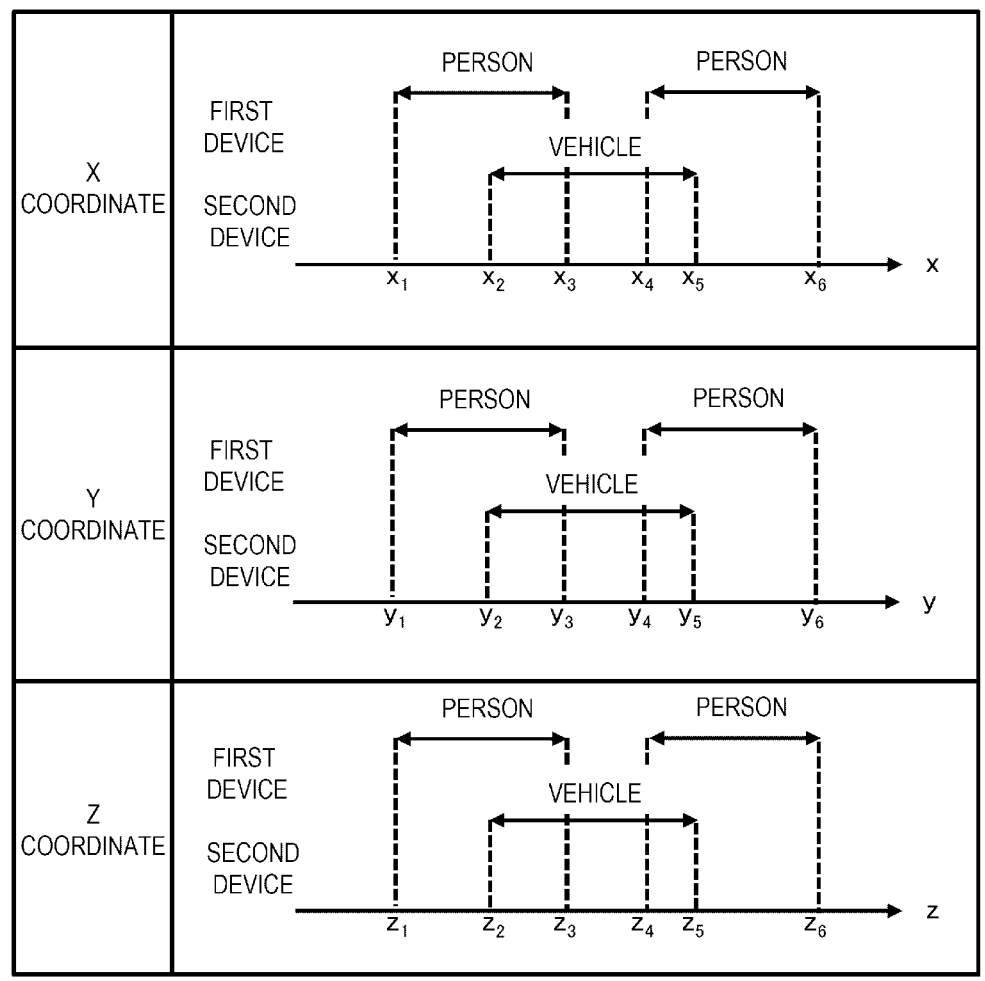

[FIG. 10]
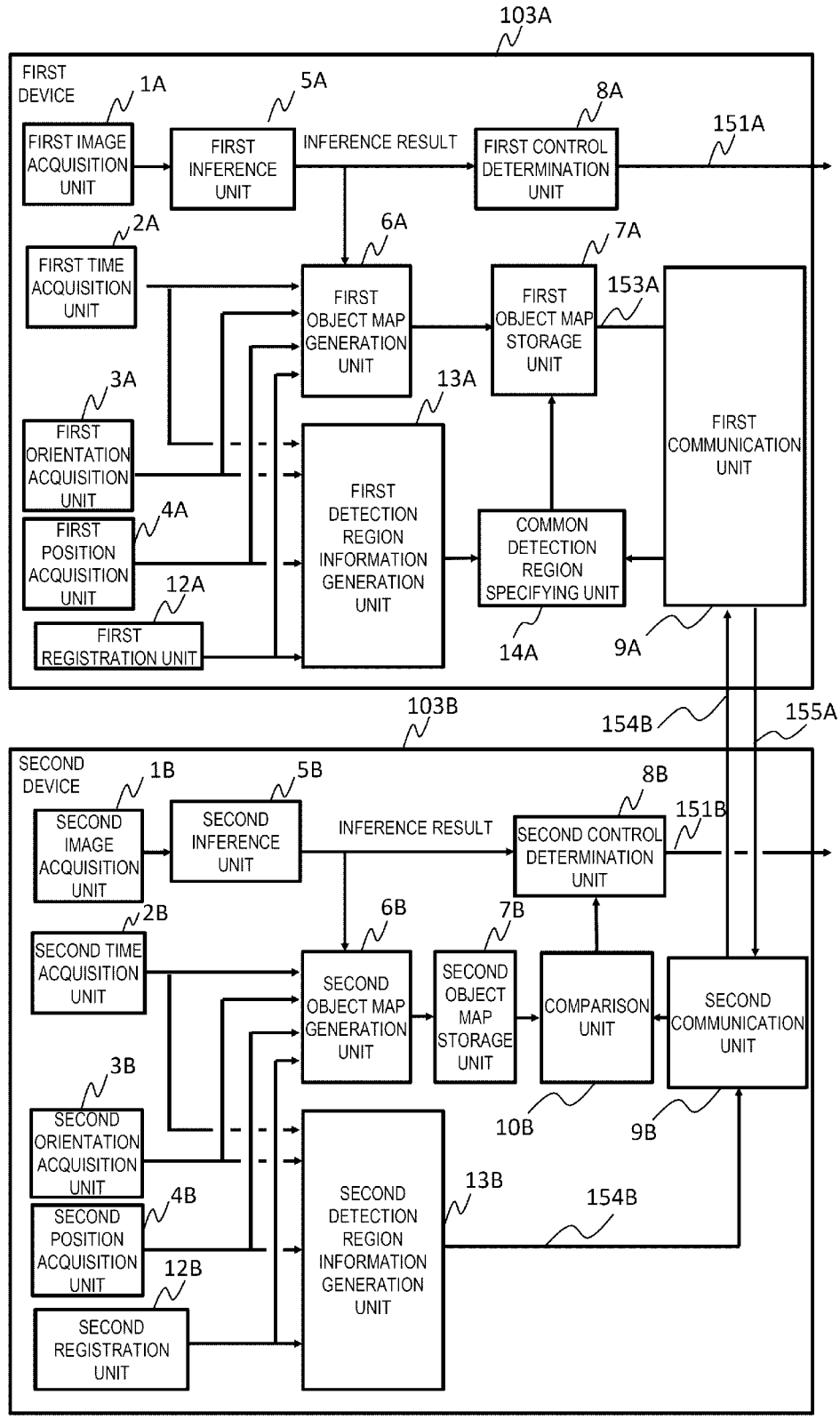

[FIG. 11]
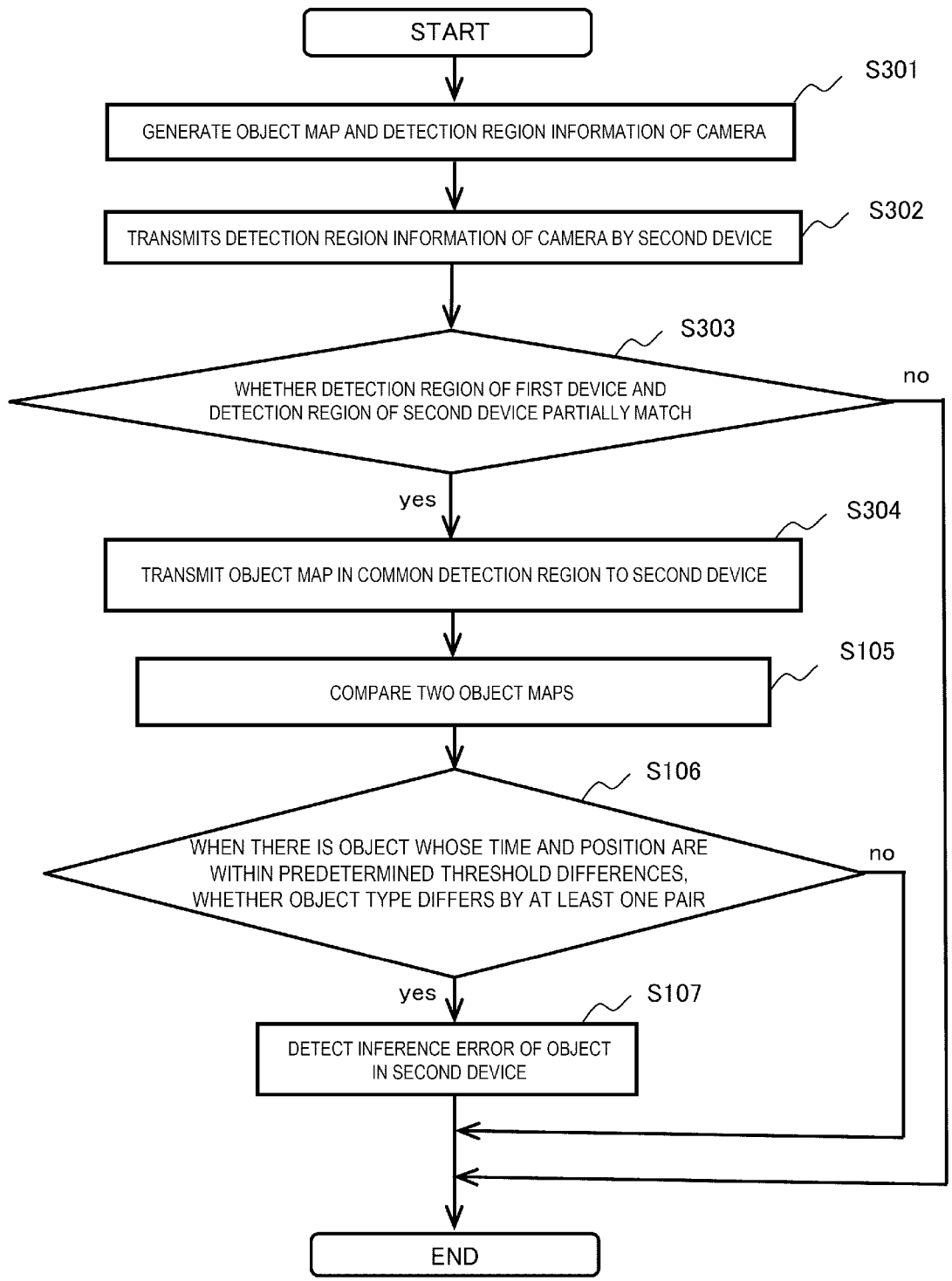

[FIG. 12]
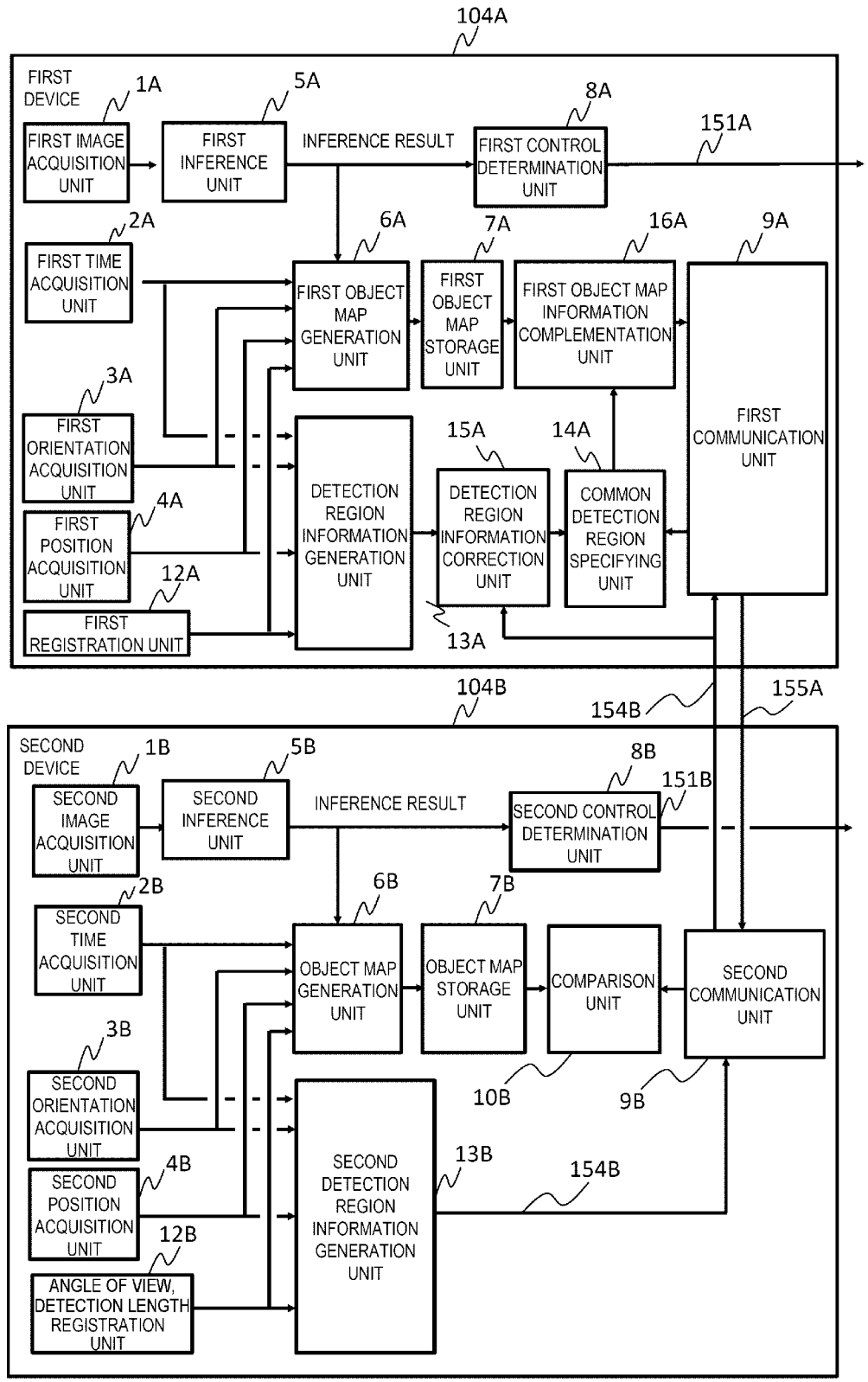

[FIG. 13]
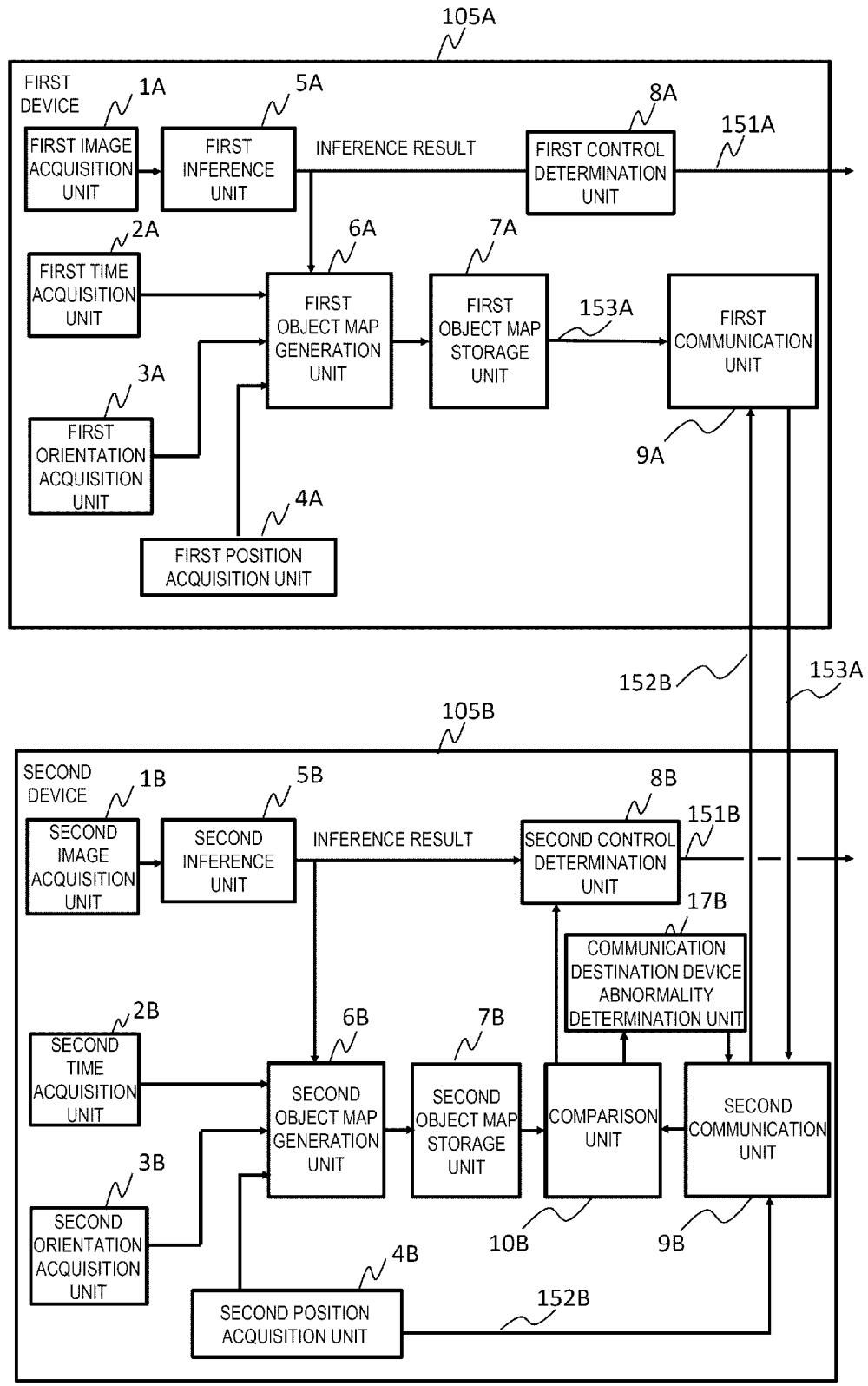

[FIG. 14]
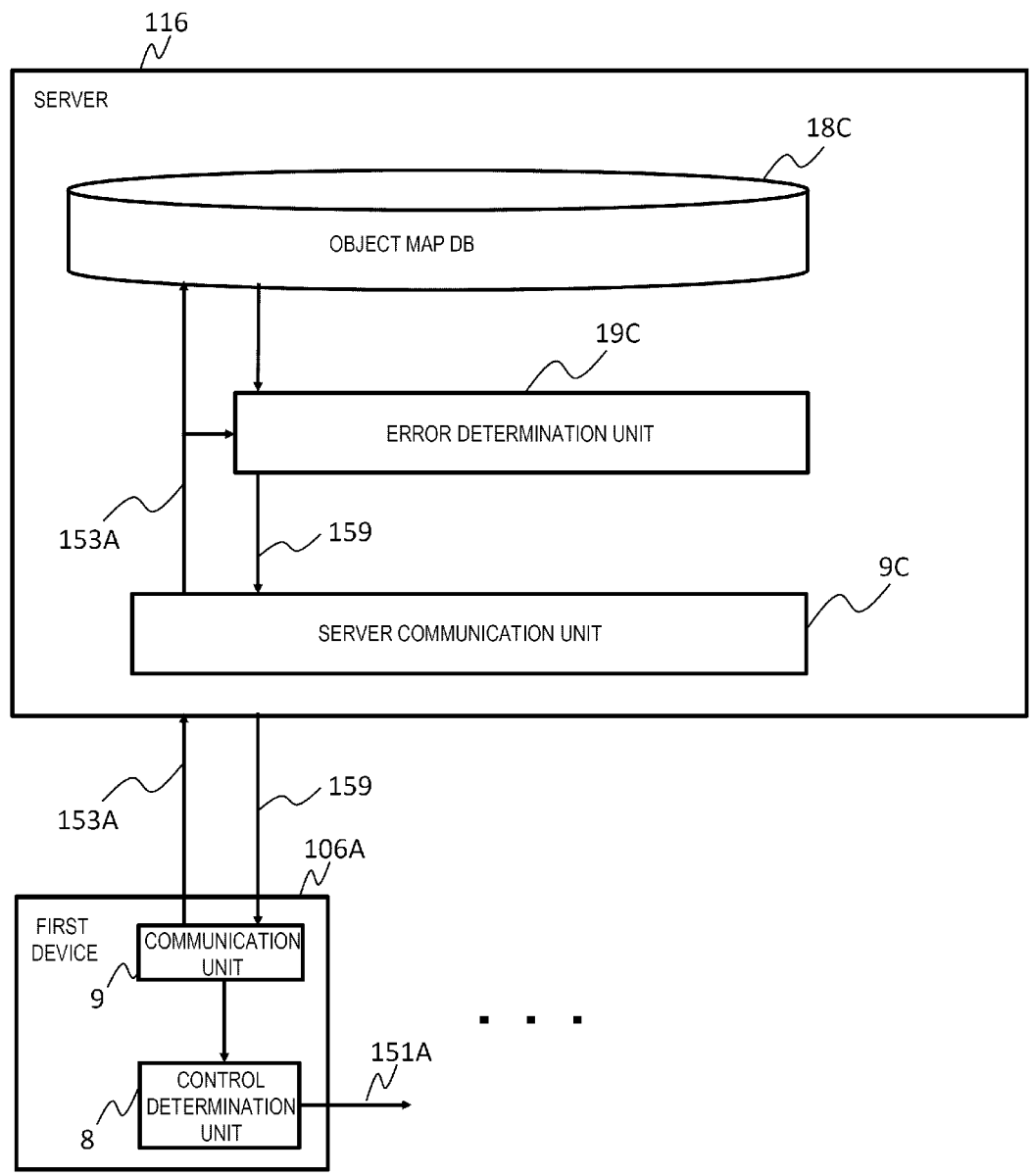

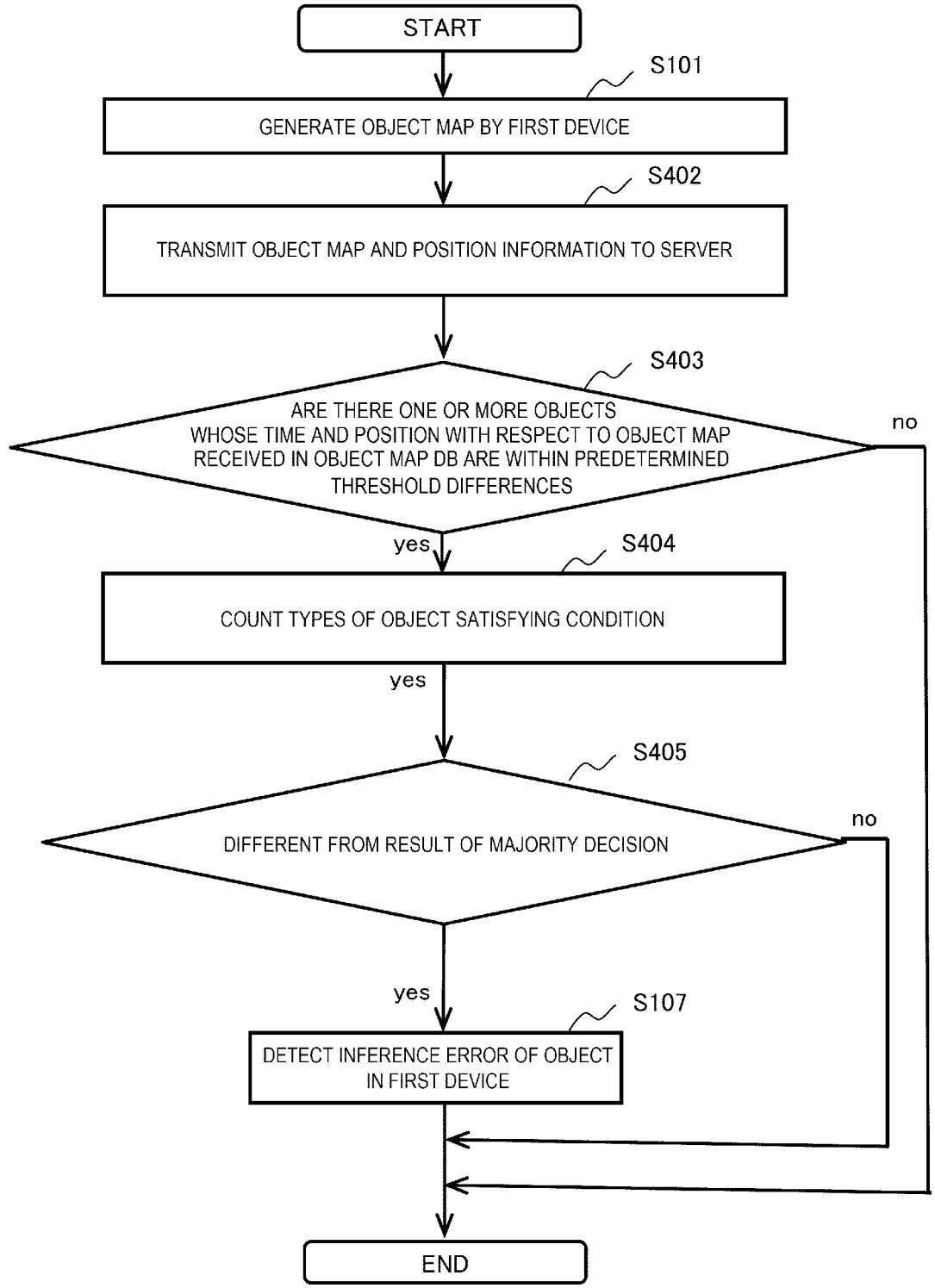
[FIG. 15]

CALCULATION SYSTEM AND CALCULATION METHOD

TECHNICAL FIELD

The present invention relates to a calculation system and a calculation method.

BACKGROUND ART

Incorporation of inference functions into an edge is progressing for autonomous operations of automobiles and industrial equipment. Since an inference error of edge equipment causes a serious accident, error detection is essential. A configuration is known in which an inference units such as neural network are made multiple redundant, inference results of the inference units for the same input are compared, and an inference unit that has an inference result different from the other inference units is specified, so as to perform detection of inference errors due to faults or failures. However, in a case of multiple redundancy, all inference units output the same inference result even if the inference is incorrect due to poor learning. Therefore, inference errors due to the poor learning cannot be detected due to the multiple redundancy of the inference units. PTL 1 disclose a signal processing device which includes a labeling unit for labeling according to a type of an imaged subject, a distance measuring unit for acquiring distance measuring information at distance measuring points disposed discretely, and an interpolation generation unit for interpolating and generating distance information between adjacent distance measuring points on the subject labeled on the same type based on a labeling result by the labeling unit.

CITATION LIST

Patent Literature

PTL 1: JP-A-2019-028861

SUMMARY OF INVENTION

Technical Problem

The invention described in PTL 1 cannot detect a discrimination error in a type of an object.

Solution to Problem

A calculation system according to a first aspect of the invention is a calculation system including a first device and a second device. The first device includes: a first object map generation unit configured to calculate, using first image information that is image information acquired by the first device, a first object map indicating a type of an object and a position of the object; and a first communication unit configured to transmit the first object map to the second device. The second device includes: a second object map generation unit configured to calculate, using second image information that is image information acquired by the second device, a second object map indicating a type of an object and a position of the object; and a comparison unit configured to compare the first object map and the second object map.

A calculation system according to a second aspect of the invention is a calculation system including a server and a plurality of terminals. Each of the plurality of terminals includes: an object map generation unit configured to calculate, using acquired image information, an object map indicating a type of an object and a position of the object; and a terminal communication unit configured to transmit the object map to the server. The server includes: an object map database storing the object map received from the plurality of terminals; and an error determination unit configured to determine correctness of the type of the object included in the received object map by a majority decision based on information stored in the object map database, and notify the terminal from which the object map is transmitted of the determination.

A calculation method according to a third aspect of the invention is a calculation method performed by a calculation system including a first device and a second device. The calculation method includes: by the first device, calculating, using first image information that is image information acquired by the first device, a first object map indicating a type of an object and a position of the object; and transmitting the first object map to the second device, and by the second device, calculating, using second image information that is image information acquired by the second device, a second object map indicating a type of an object and a position of the object; and comparing the first object map and the second object map.

Advantageous Effect

According to the invention, it is possible to detect a discrimination error in a type of an object.

BRIEF DESCRIPTION OF DRAWINGS

FIG. 1 is a functional configuration diagram of a calculation system according to a first embodiment.

FIG. 2 is a diagram showing an example of information created by a second device.

FIG. 3 is a diagram showing an example of an object map generated by a second object map generation unit.

FIG. 4 is a diagram showing a position calculation method of a movable object by an object map generation unit.

FIG. 5 is a flowchart showing an operation of the calculation system according to the first embodiment.

FIG. 6 is a functional configuration diagram of a calculation system according to a second embodiment.

FIG. 7 is a diagram showing an example of an object map including a movable object position error.

FIG. 8 is a flowchart showing an operation of the calculation system according to the second embodiment.

FIG. 9 is a diagram for showing processing of step S206.

FIG. 10 is a functional configuration diagram of a calculation system according to a third embodiment.

FIG. 11 is a flowchart showing an operation of the calculation system according to the third embodiment.

FIG. 12 is a functional configuration diagram of a calculation system according to a fourth embodiment.

FIG. 13 is a functional configuration diagram of a calculation system according to a fifth embodiment.

FIG. 14 is a functional configuration diagram of a calculation system according to a sixth embodiment.

FIG. 15 is a flowchart showing an operation of the calculation system according to the sixth embodiment.

DESCRIPTION OF EMBODIMENTS

First Embodiment

Hereinafter, a calculation system according to a first embodiment will be described with reference to FIGS. 1 to 5.

FIG. 1 is a functional configuration diagram of a calculation system S1 in the first embodiment. The calculation system S1 includes a first device 101A and a second device 101B. Configurations of the first device 101A and the second device 101B are common except for one functional block. The first device 101A and the second device 101B are, for example, vehicle-mounted cameras that have built-in cameras and are mounted in a vehicle. However, the first device 101A and the second device 101B are any of a device attached to a vehicle-mounted camera, a fixed camera, and a device attached to a fixed camera. The first device 101A and the second device 101B may be the same or different. For example, the first device 101A may be a fixed camera and the second device 101B may be a device attached to a vehicle-mounted camera. However, the configuration in which the first device 101A and the second device 101B receive a video signal from the same imaging element is excluded from a configuration of the present embodiment.

The first device 101A includes a first image acquisition unit 1A, a first time acquisition unit 2A, a first orientation acquisition unit 3A, a first position acquisition unit 4A, a first inference unit 5A, a first object map generation unit 6A, a first object map storage unit 7A, a first control determination unit 8A, and a first communication unit 9A. The second device 101B includes a second image acquisition unit 1B, a second time acquisition unit 2B, a second orientation acquisition unit 3B, a second position acquisition unit 4B, a second inference unit 5B, a second object map generation unit 6B, a second object map storage unit 7B, a second control determination unit 8B, and a second communication unit 9B, which have similar functions as those of the first device 101A. The second device 101B further includes a comparison unit 10B.

Calculation performed by the individual functional blocks included in the first device 101A and the second device 101B may be implemented by, for example, a CPU (not shown) that is a central processing unit, a ROM (not shown) that is a read-only storage device, and a RAM (not shown) that is a readable and writable storage device. Specifically, the calculation may be implemented by the CPU expanding a program stored in the ROM into the RAM and executing the program. Further, the calculation may be implemented by a field programmable gate array (FPGA) that is a rewritable logic circuit or an application specific integrated circuit (ASIC) instead of a combination of CPU, ROM, and RAM. Furthermore, the calculation may be implemented by a combination of different configurations, for example, a combination of CPU, ROM, RAM, and FPGA, instead of a combination of CPU, ROM, and RAM.

The first image acquisition unit 1A acquires a first captured image captured by a camera (not shown). However, the camera may be built in the first device 101A or may be a hardware device different from the first device 101A. The first image acquisition unit 1A outputs the acquired first captured image to the first inference unit 5A.

The first time acquisition unit 2A acquires a time using a global positioning satellite system or a network protocol. However, a receiving circuit that receives a signal from a satellite configuring the global positioning satellite system (hereinafter referred to as "GNSS receiving circuit") or a communication circuit that performs communication using the network protocol may be built in the first device 101A, or may be a different hardware device connected to the first device 101A.

The first orientation acquisition unit 3A acquires orientation, for example, an angle from 0 to 359 degrees where north is 0 degrees and east is 90 degrees, of the camera on which the first image acquisition unit 1A acquires the first captured image. However, as described above, in the present embodiment, since the first device 101A has the built-in camera, the first orientation acquisition unit 3A may also acquire orientation of the first device 101A. The first orientation acquisition unit 3A may include a gyro, or may be a communication interface with a gyro (not shown) connected to the first device 101A.

The first position acquisition unit 4A acquires a position, for example, a combination of latitude and longitude, of the camera at which the first image acquisition unit 1A acquires the first captured image. However, as described above, in the present embodiment, since the first device 101A has the built-in camera, the first position acquisition unit 4A may also acquire a position of the first device 101A. The first position acquisition unit 4A may include the receiving circuit that receives the signal from the satellite configuring the global positioning satellite system, or may be a communication interface with a GNSS receiving circuit (not shown) connected to the first device 101A.

The first inference unit 5A processes the first captured image acquired by the first image acquisition unit 1A, and infers a type of a subject in the first captured image by using a classifier configured with a neural network acquired by learning in advance. Further, the first inference unit 5A specifies the type of the subject captured in the first captured image and coordinates of the subject on the first captured image. In the following, the subject may be referred to as an "object" or a "movable object", and is simply referred to as a "movable object" for the sake of convenience since it is not intended to exclude a stationary object, but a movable object that is not fixed to the ground is detected more frequently.

The first object map generation unit 6A generates an object map periodically or at a timing defined by a user based on an inference result by the first inference unit 5A, a time acquired by the first time acquisition unit 2A, position information of the camera acquired by the first position acquisition unit 4A, and orientation information of the camera acquired by the first orientation acquisition unit 3A. The object map will be described below. The first object map storage unit 7A stores a plurality of object maps generated by the first object map generation unit 6A. Hereinafter, an object map generated by the first object map generation unit 6A may be referred to as a "first object map", and an object map generated by the second object map generation unit 6B may be referred to as a "second object map".

The first control determination unit 8A performs calculation using the inference result output by the first inference unit 5A, and outputs control information 151A to the outside of the first device 101A. A content of the calculation executed by the first control determination unit 8A is not particularly limited. For example, when the first device 101A is mounted on the vehicle, the control information 151A indicating a steering angle based on the inference result may be output. Further, the first control determination unit 8A may output, as the control information 151A, the inference result as it is without performing special calculation.

The first communication unit 9A performs communication with the second device 101B and calculation described below. The first communication unit 9A includes a communication module configured to perform wireless communication. The first communication unit 9A acquires position information 152B from the second device 101B, and when it is determined that a condition is satisfied by the calculation described below, the first communication unit 9A transmits an object map 153A stored in the first object map storage unit 7A to the second device 101B. The above is the description of the configuration provided in the first device 101A.

Configurations and operations of the second image acquisition unit 1B, the second time acquisition unit 2B, the second orientation acquisition unit 3B, the second position acquisition unit 4B, the second inference unit 5B, the second object map generation unit 6B, and the second object map storage unit 7B, which are provided in the second device 101B, are substantially the same as the configurations and the operations of the corresponding functional blocks in the first device 101A, and only differences will be described below. Operations of the second control determination unit 8B, the second communication unit 9B, and the comparison unit 10B will be described in detail.

The second image acquisition unit 1B acquires a second captured image captured by a camera (not shown). The second captured image is an image different from the first captured image. The second image acquisition unit 1B outputs the acquired second captured image to the second inference unit 5B. The second orientation acquisition unit 3B acquires orientation of the camera on which the second image acquisition unit 1B acquires the second captured image. The second position acquisition unit 4B acquires a position of the camera at which the second image acquisition unit 1B acquires the second captured image. The second inference unit 5B infers a type of a subject in the second captured image acquired by the second image acquisition unit 1B, and specifies coordinates of the subject on the second captured image. An algorithm and implementation of the second inference unit 5B may be the same as or different from that of the first inference unit 5A. The second communication unit 9B transmits the position information 152B acquired by the second position acquisition unit 4B to the first device 101A.

The second object map generation unit 6B generates an object map periodically or at a timing defined by the user based on an inference result by the second inference unit 5B, a time acquired by the second time acquisition unit 2B, position information of the camera acquired by the second position acquisition unit 4B, and orientation information of the camera acquired by the second orientation acquisition unit 3B. The second object map storage unit 7B stores a plurality of object maps generated by the second object map generation unit 6B.

The comparison unit 10B compares the object map received from the first device 101A with the object map created by the second device 101B. Specifically, the comparison unit 10B detects a contradiction between the object map received from the first device 101A and the object map created by the second device 101B on the assumption that the object map received from the first device 101A has no error. Since images received from the first device 101A and the second device 101B are different, it does not matter that the object maps created by the first device 101A and the second device 101B do not completely match. However, for example, when in the object map created by the first device 101A, a vehicle is detected at a certain position, and in the object map created by the second device 101B, a pedestrian is detected at the same position, it is determined that there is a contradiction. The comparison unit 10B outputs a comparison result to the second control determination unit 8B.

The second control determination unit 8B determines whether the object map created by the second device 101B includes an error using the output of the comparison unit 10B. When the second control determination unit 8B determines that the object map created by the second device 101B includes an error, the second control determination unit 8B outputs control information 151B instructing a control that attaches importance to safety, for example, a degenerate operation. When the second control determination unit 8B determines that the object map created by the second device 101B does not include an error, the second control determination unit 8B outputs the control information 151B instructing normal traveling.

FIG. 2 is a diagram showing an example of information created by the second device 101B. In the example shown in FIG. 2, three times t1, t2, and t3 acquired by the second time acquisition unit 2B, positions of the second device 101B acquired by the second position acquisition unit 4B and orientation of the second device 101B acquired by the second orientation acquisition unit 3B, and object maps generated by the second object map generation unit 6B at each time are shown.

FIG. 3 is a diagram showing an example of an object map generated by the second object map generation unit 6B. However, the rightmost column in FIG. 3 shows the comparison result of the object maps. As shown in FIG. 3, positions and the number of movable objects described in the object map change with the time. The comparison result of the object maps shown in the rightmost column in FIG. 3 is a result acquired by the second device 101B receiving the object map from the first device 101A and by the comparison unit 10B comparing the object maps. In FIG. 3, the matched movable object is described as "matched", the mismatched movable object is described as "mismatched", and the movable object not compared is described as "not compared". In FIG. 3, the position of the movable object is described as a representative point of the movable object, for example, a position of a center of gravity, but a range of a space occupied by the movable object may be the position of the movable object. In this case, position information of each movable object has a width for each of the three dimensions of XYZ.

FIG. 4 is a diagram showing a position calculation method of a movable object by the first object map generation unit 6A. A position calculation method of the movable object by the second object map generation unit 6B is the same, and here, the position calculation method of the movable object by the first object map generation unit 6A will be representatively described. FIG. 4(a) shows a plan view and FIG. 4(b) shows a side view. Assuming that the position of the first device 101A is $(x_c, y_c, z_c)$, a three-dimensional position $(x_m, y_m, z_m)$ of the movable object is represented by the following Formula 1.

$$(x_m, y_m, z_m) = \qquad\qquad\qquad\text{[Formula 1]}$$
$$L\{\cos(\theta_h + \Delta\theta_h), \sin(\theta_h + \Delta\theta_h), \sin(\theta_v + \Delta\theta_v)\} + (x_c, y_c, z_c)$$

However, in the above Formula 1, L represents a distance from the camera to the movable object, and $\theta_h$ and $\theta_v$ respectively represent an angle of view in a plane and an angle of view in a side surface of the camera. Further, $\Delta\theta_h$ represents an angle in a plane from the camera to the movable object when a length direction of the camera is taken as a reference axis, and $\Delta\theta_h$ represents an angle in a side surface from the camera to the movable object.

FIG. 5 is a flowchart showing an operation of the calculation system S1 according to the first embodiment. However, since an execution subject of each step described below is different for each step, the execution subject will also be described for each step. The calculation system S1 executes processing described below in a predetermined time period. First, in step S101, the first object map generation unit 6A and the second object map generation unit 6B generate individual object maps. In subsequent step S102, the second communication unit 9B transmits the position information acquired by the second position acquisition unit 4B to the first device 101A.

In subsequent step S103, the first communication unit 9A of the first device performs the following determination. That is, the first communication unit 9A determines whether a difference of at least one movable object position between in the position information received in step S102 and in the object map generated by the first object map generation unit 6A in step S101 is within a predetermined threshold. When the first communication unit 9A determines that the difference is within the predetermined threshold, the processing proceeds to step S104, and when the first communication unit 9A determines that there is no movable object within the predetermined threshold, the processing shown in FIG. 5 is completed.

In step S104, the first communication unit 9A transmits the object map generated by the first object map generation unit 6A to the second device 101B. In subsequent step S105, the comparison unit 10B compares the two object maps, that is, the object map generated by the first object map generation unit 6A and the object map generated by the second object map generation unit 6B. In subsequent step S106, the comparison unit 10B determines, when there is a movable object whose time and position are within predetermined threshold differences, whether the type of the movable object differs by at least one pair.

In step S106, when the comparison unit 10B makes an affirmative determination, for example, when the first object map generation unit 6A and the second object map generation unit 6B output different types at the same position and the same time, the processing proceeds to step S107. In step S106, when the comparison unit 10B makes a negative determination, the processing shown in FIG. 5 is completed. In step S107, the comparison unit 10B transmits the comparison result to the second control determination unit 8B, the second control determination unit 8B detects an inference error of the movable object in the second device 101B, and the processing shown in FIG. 5 is completed. Accordingly, the second control determination unit 8B outputs control information instructing a control corresponding to occurrence of the inference error, for example, a degenerate operation, to the outside of the second device 101B.

According to the first embodiment described above, the following operational effects can be acquired.

(1) The calculation system S1 includes the first device 101A and the second device 101B. The first device 101A includes: the first object map generation unit 6A configured to calculate, using first image information that is image information acquired by the first device 101A, a first object map indicating a type of an object and a position of the object; and the first communication unit 9A configured to transmit the first object map to the second device 101B. The second device 101B includes: the second object map generation unit 6B configured to calculate, using second image information that is image information acquired by the second device 101B, a second object map indicating a type of an object and a position of the object; and the comparison unit 10B configured to compare the first object map and the second object map. Therefore, it is possible to detect a discrimination error in the type of the object. Accordingly, the maintainability and reliability of the second device 101B are improved. It is conceivable that many stationary objects such as buildings fixed to the ground are stored in a database in advance. However, since an update frequency and an accuracy of the database may not always be sufficient, there is certain significance in detecting a position of a movable object as well as a stationary object and estimating the type of the object.

(2) The first communication unit 9A of the first device 101A is configured to transmit the first object map when a difference between a position indicated by position information received from the second device 101B and a position of the object included in the first object map is within a predetermined distance. Therefore, when the distance between the positions is large, the object map is not transmitted, and useless communication can be prevented.

(3) The first object map generation unit 6A and the second object map generation unit 6B set a movable object that is not fixed to a ground as a detection target.

(4) The first object map generation unit 6A and the second object map generation unit 6B are configured to calculate the type of the object by inference based on machine learning. The comparison unit 10B is configured to detect an inference error by comparing the first object map and the second object map. Therefore, the type of the object can be calculated more accurately than in the case of using pattern matching.

(Modification 1)

At least one of the first inference unit 5A and the second inference unit 5B may not perform the inference using machine learning. In this case, a type of a subject may be determined using another known method, for example, pattern matching.

(Modification 2)

The second communication unit 9B may not transmit position information to the first device 101A, and the first device 101A may unconditionally transmit the object map 153A. That is, in the present modification, the first device 101A, the second device 101B, and the like may perform broadcast communication in which the created object map is transmitted to surroundings without limiting a destination.

(Modification 3)

In the first embodiment described above, the objects detected by the first inference unit 5A and the second inference unit 5B are a stationary object and a movable object. However, the first inference unit 5A and the second inference unit 5B may limit the detection target to a movable object.

(Modification 4)

In the first embodiment described above, functional configurations of the first device 101A and the second device 101B are not the same. However, both may have the same functional configuration. That is, the first device 101A may further include a functional block having the same function as the comparison unit 10B. In this case, the first device 101A and the second device 101B mutually transmit the position information and the object maps.

Second Embodiment

A calculation system according to a second embodiment will be described with reference to FIGS. 6 to 9. In the following description, the same components as those of the first embodiment are denoted by the same reference numerals, and differences will be mainly described. Points that are not specifically described are the same as those of the first embodiment. The present embodiment is different from the first embodiment mainly in a point of considering an identification error.

FIG. 6 is a functional configuration diagram of a calculation system S2 according to the second embodiment. In FIG. 6, the same configurations as those in the first embodiment are denoted by the same reference numerals. The calculation system S2 further includes a sensor error first registration unit 11A and a sensor error second registration unit 11B in addition to the configurations of the calculation system S1 according to the first embodiment. Sensor error information such as a distance identification error and a GPS error is registered in the sensor error first registration unit 11A and the sensor error second registration unit 11B. The first object map generation unit 6A and the second object map generation unit 6B generate object maps including a movable object position error by using the respective information.

FIG. 7 is a diagram showing an example of the object map including the movable object position error. A movable object position including an error represents a range, not a single value. $\Delta x$ in $\pm \Delta x$ is a constant. When the first line of FIG. 7 is specifically described, it is shown that an X coordinate of a movable object determined to be a pedestrian at a time t1 is at any position from "$x_1 - \Delta x_1$" to "$x_1 + \Delta x_1$" when an error is added.

FIG. 8 is a flowchart showing an operation of the calculation system S2 according to the second embodiment. The similar operations as those in the first embodiment are denoted by the same step numbers and the description thereof is omitted. First, in step S201, the first object map generation unit 6A and the second object map generation unit 6B generates individual object maps including a position error. Processing of subsequent step S102 and step S103 is similar to that in the first embodiment. However, when an affirmative determination is made in step S103, the processing proceeds to step S204.

In step S204, the first communication unit 9A transmits the object map including the position error generated by the first object map generation unit 6A to the second device 101B. In subsequent step S205, the comparison unit 10B compares the object maps including the two position errors. In subsequent step S206, the comparison unit 10B determines whether there is a movable object whose movable object position ranges partially match in the three dimensions at a time within a predetermined threshold difference and whose movable object types are different in all three dimensions. The processing of this step will be described below with reference to the drawing.

FIG. 9 is a diagram showing the processing of step S206, and shows ranges of a movable object position including an error in object maps created respectively by a first device 102A and the second device 102B and movable object types. However, in FIG. 9, the position of a movable object is shown separately for each of the X coordinate, the Y coordinate, and the Z coordinate. In the X coordinate, the range of the movable object position including the error that the first device 102A infers the movable object as a person is $x_1 < x < x_3$ and $x_4 < x < x_6$. Further, the range of the movable object position including the error that the second device 102B infers the movable object as a vehicle is $x_2 < x < x_5$. Therefore, the ranges of the movable object position match in the ranges of $x_2 < x < x_3$ and $x_4 < x < x_5$. Further, in both ranges that match, the movable object types are different, which are person and vehicle.

Regarding the Y coordinate, the ranges of the movable object position match in both ranges of $y_2 < y < y_3$ and $y_4 < y < y_5$, and the movable object types are different in both ranges. Furthermore, regarding the Z coordinate, the ranges of the movable object position match in both ranges of $z_2 < z < z_3$ and $z_4 < z < z_5$, and the movable object types are different in both ranges. As in the example shown in FIG. 9, the range of the movable object position including the error in the object map of the second device 102B matches with a part of the range of the movable object position including the error in the object map of the first device 102A in all three dimensions of XYZ, and when the movable object types are different in all three dimensions, an affirmative determination is made in step S206.

When an affirmative determination is made in step S206, the processing proceeds to step S107, and when a negative determination is made in step S206, the processing shown in FIG. 8 is completed. Since the processing of step S107 is similar to that in the first embodiment, the description is omitted.

According to the second embodiment described above, the following operational effect can be acquired.

(5) The first object map generation unit 6A is configured to calculate, based on a position error related to the first image information, the first object map including the position error in the position of the object. The second object map generation unit 6B is configured to calculate, based on a position error related to the second image information, the second object map including the position error in the position of the object. The comparison unit 10B is configured to compare the first object map including the position error and the second object map including the position error. Therefore, by generating the object maps including a position error of an object and comparing the object maps including movable object position errors among a plurality of devices, it is possible to detect an inference error of the movable object even if there is a position error of the object.

Third Embodiment

A calculation system according to a third embodiment will be described with reference to FIGS. 10 and 11. In the following description, the same components as those of the first embodiment are denoted by the same reference numerals, and differences will be mainly described. Points that are not specifically described are the same as those of the first embodiment. The present embodiment is different from the first embodiment mainly in a point that only object maps included in detection ranges of two cameras are transmitted.

FIG. 10 is a functional configuration diagram of a calculation system S3 according to the third embodiment. In FIG. 10, the same configurations as those in the first embodiment are denoted by the same reference numerals. A first device 103A includes a first registration unit 12A, a first detection region information generation unit 13A, and a common detection region specifying unit 14A in addition to the configuration of the first device 101A in the first embodiment. A second device 103B includes a second registration unit 12B and a second detection region information generation unit 13B in addition to the configuration of the second device 101B in the first embodiment.

Information including horizontal and vertical angles of view and the maximum detection length of a camera provided in the first device 103A is input to the first registration unit 12A. The information may be input to the first registration unit 12A from the outside of the first device 103A, or the first registration unit 12A may read the information from a storage region provided in the first device 103A. Information including horizontal and vertical angles of view and the maximum detection length of a camera provided in the second device 103B is input to the second registration unit 12B. The information may be input to the second registration unit 12B from the outside of the second device 103B, or the second registration unit 12B may read the information from a storage region provided in the second device 103B.

The first detection region information generation unit 13A generates detection region information of the camera provided in the first device 103A by using the following formula and information acquired by the first position acquisition unit 4A, the first orientation acquisition unit 3A, and the first registration unit 12A.

$$x_c \leq x \leq x_c + L_{max}$$

$$-x \tan \theta_h + y_c \leq y \leq x \tan \theta_h + y_c$$

$$-x \tan \theta_v + z_c \leq z \leq x \tan \theta_v + z_c \quad \text{[Formula 2]}$$

Here, ranges of x, y, and z respectively represent a range of a detection region in a three-dimensional coordinate system. $L_{max}$ is the maximum detection length of the camera. The first detection region information generation unit 13A outputs the generated detection region information to the common detection region specifying unit 14A. The detection region information may be a specific numerical value acquired by evaluating the above formula, that is, a range of latitude or longitude, or may be a value of each parameter used in the above formula.

The second detection region information generation unit 13B generates detection region information 154B of the camera provided in the second device 103B by using the same formula as the first detection region information generation unit 13A and information acquired by the second position acquisition unit 4B, the second orientation acquisition unit 3B, and the second registration unit 12B. The second detection region information generation unit 13B transmits the generated detection region information 154B to the first device 103A via the second communication unit 9B. The first communication unit 9A of the first device 103A outputs the detection region information 154B received from the second device 103B to the common detection region specifying unit 14A. In the present embodiment, the second communication unit 9B does not transmit position information of the camera to the first device 103A.

The common detection region specifying unit 14A specifies, based on the detection region information generated by the first device 103A and the detection region information 154B received from the second device 103B, a common detection region, which is a region where the first device 103A and the second device 103 can commonly detect an object. For example, the common detection region specifying unit 14A specifies a region where two regions indicated by the two pieces of detection region information overlap as the common detection region, sets the maximum rectangle included in the common detection region, and outputs latitude and longitude of four vertices of the rectangle. The common detection region specifying unit 14A outputs the specified common detection region to the first communication unit 9A. When the two regions indicated by the two pieces of detection region information do not overlap, the common detection region specifying unit 14A may output, for example, the common detection region as an empty set, or may not perform any output.

The first communication unit 9A transmits, to the second device 101B, only information 155A of a movable object included in the common detection region set by the common detection region specifying unit 14A in the object map 153A stored in the first object map storage unit 7A.

FIG. 11 is a flowchart showing an operation of the calculation system S3 according to the third embodiment. The similar operations as those in the first embodiment are denoted by the same step numbers and the description thereof is omitted. First, in step S301, the first device 103A and the second device 103B generates individual object maps and the detection region information of the cameras. That is, in this step, the first object map generation unit 6A, the second object map generation unit 6B, the first detection region information generation unit 13A, and the second detection region information generation unit 13B operate.

In subsequent step S302, the second communication unit 9B of the second device 103B transmits the detection region information generated by the second detection region information generation unit 13B to the first device 103A. Upon receiving the detection region information, the first communication unit 9A of the first device 103A outputs the detection region information to the common detection region specifying unit 14A. In subsequent step S303, the common detection region specifying unit 14A specifies the overlap between the two pieces of detection region information as the common detection region, and outputs the common detection region to the first communication unit 9A. The first communication unit 9A determines whether at least a part of a detection region of the first device 103A and a detection region of the second device 103B match, that is, whether there is the common detection region. When the first communication unit 9A determines that there is the common detection region, the processing proceeds to step S304, and when the first communication unit 9A determines that there is no common detection region, for example, is an empty set, the processing shown in FIG. 11 is completed.

In step S304, the first communication unit 9A transmits, to the second device 103B, the object map 155A included in the common detection region in the object map 153A generated by the first object map generation unit 6A, and the processing proceeds to step S105. The processing after step S105 is similar to that in the first embodiment, and the description is omitted.

According to the third embodiment described above, the following operational effect can be acquired.

(6) The second device 103B includes the second communication unit 9B configured to transmit, to the first device 103A, information indicating a second detection region that is a geographical range of a subject included in the second image information. The first communication unit 9A of the first device 103A is configured to transmit, to the second device 103B, only information of an object included in the second detection region in the first object map. As described above, in the present embodiment, information of a detection region is shared between the first device 103A and the second device 103B, and the first device 103A transmits the object map in the common detection region to the second device 103B. Therefore, a communication load can be reduced as compared with a case where all data of the object map is transmitted. Therefore, inference error detection of an object can be performed more quickly and efficiently than in the first embodiment and the second embodiment.

Fourth Embodiment

A calculation system according to a fourth embodiment will be described with reference to FIG. 12. In the following description, the same components as those of the third embodiment are denoted by the same reference numerals, and differences will be mainly described. Points that are not specifically described are the same as those of the third embodiment. The present embodiment is different from the first embodiment mainly in a point of considering a time shift in evaluation of the detection region.

First, problem awareness which is a background of the present embodiment will be described. Since calculation and communication take time, communication latency is inevitable. Therefore, in the third embodiment, when the common detection region specifying unit 14A receives the two pieces of detection region information at the same time, the information of the second device 103B is older than the information of the first device 103A. In this case, it is difficult to specify the common detection region at the same time. Further, in object maps at a plurality of times stored in the first object map storage unit 7A of the first device 103A, when there is no object map at a time of the detection region information received from the second device 103B, the object maps cannot be compared. The present embodiment solves the problem.

FIG. 12 is a functional configuration diagram of a calculation system S4 according to the fourth embodiment. In FIG. 12, the same configurations as those in the third embodiment are denoted by the same reference numerals. A first device 104A includes a detection region information correction unit 15A and an object map information complementation unit 16A in addition to the configuration of the first device 103A in the third embodiment. A configuration of a second device 104B is the same as the configuration of the second device 103B in the third embodiment.

The detection region information correction unit 15A corrects current detection region information of the first device 104A to detection region information of the first device 104A at a past time, that is, at a time slightly before. Specifically, the detection region information correction unit 15A corrects the current detection region information of the first device 104A to the detection region information of the first device 104A at the time of the detection region information of the second device 104B.

For example, the detection region information correction unit 15A is caused to store detection region information at a plurality of times t1 and t2 received from the first detection region information generation unit 13A. Then, when the detection region information correction unit 15A receives detection region information at a time t between the time t1 and the time t2 from the second device 104B, the detection region information correction unit 15A performs the following processing. That is, the detection region information correction unit 15A generates the detection region information at the time t assuming that during the period from time t1 to time t2, $(x_c, y_c, z_c)$, $\theta_h$, $\theta_v$ in Formula 2 change linearly with a change in the time. $L_{max}$ in Formula 2 is constant regardless of time.

The object map information complementation unit 16A generates an object map at the time t between the time t1 and the time t2 using the object maps at the plurality of times t1 and t2. For example, the object map information complementation unit 16A generates the object map at the time t between the time t1 and the time t2 assuming that a movable object position changes linearly with a change of time from the time t1 to the time t2 if movable object types of a specific movable object match at the time t1 and the time t2.

When the second device 104B transmits time information together with the detection region information, the detection region information correction unit 15A may use the received time information as the time t. When the second device 104B does not transmit the time information together with the detection region information, a time, which is acquired by subtracting a known communication latency, for example, 10 ms from the time when the second device 104B receives the detection region information, is the time t.

According to the fourth embodiment described above, the following operational effect can be acquired.

(7) The first device 104A includes: the detection region information correction unit 15A configured to acquire first detection regions that are geographical ranges of a subject included in the first image information at a plurality of times, and calculate the first detection region at any time; and the object map information complementation unit 16A configured to calculate the first object map at any time by using the first object maps at a plurality of times calculated by the first object map generation unit 6A. The first communication unit 9A of the first device 104A is configured to, when receiving the second detection region from the second device 104B, transmit to the second device, the first object map at a time related to the second detection region calculated by the object map information complementation unit 16A, that is, information of an object included in a common region between the second detection region and the first detection region at the time related to the second detection region which is calculated by the detection region information correction unit 15A. In the fourth embodiment described above, by adding a function of correcting detection region information and a function of complementing object map information, it is possible to perform inference error detection of a movable object by comparing object maps even if there is communication latency between devices or when there is no object map at a specific time.

Fifth Embodiment

A calculation system according to a fifth embodiment will be described with reference to FIG. 13. In the following description, the same components as those of the first embodiment are denoted by the same reference numerals, and differences will be mainly described. Points that are not specifically described are the same as those of the first embodiment.

FIG. 13 is a functional configuration diagram of a calculation system S5 according to the fifth embodiment. In FIG. 13, the same configurations as those in the first embodiment are denoted by the same reference numerals. A second device 105B further includes a communication destination device abnormality determination unit 17B in addition to the configuration of the second device 101B in the first embodiment. In the present embodiment, the comparison unit 10B also outputs a comparison result of object maps to the communication destination device abnormality determination unit 17B. The communication destination device abnormality determination unit 17B outputs, to the second communication unit 9B, an abnormality determination signal for changing a communication destination when an inference error of a movable object is detected continuously for a predetermined number of times or more. The second communication unit 9B changes the communication destination when receiving the abnormality determination signal. Two or more communication destinations are registered in advance in the second communication unit 9B, and when the abnormality determination signal is received, the communication destination is switched in order.

According to the fifth embodiment described above, the following operational effect can be acquired.

(8) The second device 105B includes the communication destination device abnormality determination unit 17B configured to determine an abnormality of a first device 105A according to a plurality of comparison results of movable object maps, and change a communication destination of the second device 105B. In another embodiment, when the first inference unit 5A of the first device is faulty and a type of an object is always wrong, the comparison unit determines that an inference error of a movable object occurs in the second device even though the type of the object calculated by the second device is correct. However, according to the present embodiment, when a failure occurs in the first device 105A, the communication destination of the second device 105B can be changed to a device other than the first device 105A. Therefore, it is possible to prevent the case where an inference error in the second device 105B is determined, which causes an unnecessary abnormal stop.

Sixth Embodiment

A calculation system according to a sixth embodiment will be described with reference to FIGS. 14 and 15. In the following description, the same components as those of the first embodiment are denoted by the same reference numerals, and differences will be mainly described. Points that are not specifically described are the same as those of the first embodiment. The present embodiment is different from the first embodiment mainly in a point that object maps are collected from a large number of devices and a majority decision is made.

FIG. 14 is a functional configuration diagram of a calculation system S6 according to the sixth embodiment. In FIG. 14, the same configurations as those in the first embodiment are denoted by the same reference numerals. The calculation system S6 includes two or more first devices 106A having the same configuration as the first device 101A in the first embodiment, and a server 116. A functional configuration of the first device 106A is similar to that of the first embodiment. However, in the present embodiment, the first communication unit 9A communicates with a server 20 and transmits not only an object map but also position information. Hereinafter, the first device 106A may be referred to as a "terminal".

The server 116 includes a server communication unit 9C that communicates with a plurality of first devices 106A, an object map DB 18C that stores the object map 153A transmitted from the plurality of first devices 106A as a database (DB), and an error determination unit 19C that determines an inference error of a movable object. The server communication unit 9C receives the object map 153A and position information from the first device 106A and records in the object map DB 18C. When the first device 106A transmits time information together with the object map 153A, the time information is also recorded in the object map DB 18C, and when the first device 106A does not transmit the time information, the time of receiving is recorded together with the object map 153A.

When the server 116 receives the object map 153A from any of the first devices 106A, the error determination unit 19C performs the following processing. That is, the error determination unit 19C reads, from the object map DB 18C, an object map whose differences of a time and a movable object position with respect to the received object map 153A are within thresholds. Then, the error determination unit 19C determines whether a movable object type of an object map in the device whose time and movable object position are within the threshold differences matches with a result of a majority decision related to a movable object type of the object map stored in the object map DB 18C, for example.

Further, the error determination unit 19C notifies the first device 106A from which the object map 153A is transmitted of a notification 159 indicating whether the movable object type matches the result of the majority decision.

The first control determination unit 8A of the first device 106A changes a control content using the notification 159 received from the server 116. For example, when the notification 159 indicating that the movable object type does not match the result of the majority decision is received from the server 116, the first control determination unit 8A outputs control information instructing a control that attaches importance to safety, for example, a degenerate operation since the inference includes an error. Further, when the notification 159 indicating that the movable object type matches the result of the majority decision is received from the server 116 and no special notification is received from the server 116, the first control determination unit 8A outputs control information instructing normal traveling.

FIG. 15 is a flowchart showing an operation of the calculation system S6 according to the sixth embodiment. The similar operations as those in the first embodiment are denoted by the same step numbers and the description thereof is omitted. First, in step S101, the first device 106A generates an object map. In subsequent step S402, the first device 106A transmits, to the server 116, the object map generated in step S101 and position information acquired by the first position acquisition unit 4A.

In subsequent step S403, the error determination unit 19C of the server 116 determines whether there is one or more pieces of information of a movable object whose time and position with respect to the object map received in the object map DB 18C are within predetermined thresholds. When the error determination unit 19C determines that there is at least one piece of information of the movable object that satisfies the condition, the processing proceeds to step S404, and when the error determining unit 19C determines that there is no such information, the processing shown in FIG. 15 is completed since comparison cannot be performed.

In step S404, the error determination unit 19C counts types of the movable object that is determined to satisfy the condition in step S403. For example, the error determination unit 19C counts the received object map and the movable object types of the movable object whose time and position are within the predetermined thresholds, and calculates that the total is "3" for vehicle and "1" for person. In subsequent step S405, the error determination unit 19C uses the result of the count in step S404 to determine whether a majority decision, that is, the movable object type having the largest total number does not match the movable object type in the object map received in step S402. When the error determination unit 19C determines that the movable object types do not match, the error determination unit 19C transmits the notification 159 indicating that the movable object types do not match to the first device 106A from which the object map is transmitted in step S102, and the processing proceeds to step S107.

When the error determination unit 19C determines that the movable object types match in step S405, the error determination unit 19C transmits the notification 159 indicating that the movable object types match to the first device 106A from which the object map is transmitted in step S102, and the processing shown in FIG. 15 is completed. However, when the error determination unit 19C determines that the movable object types match in step S405, the processing shown in FIG. 15 may be completed without transmitting any notification to the first device 106A from which the object map is transmitted in step S102.

According to the sixth embodiment described above, the following operational effect can be acquired.

(9) The calculation system S6 includes the server 116 and the plurality of terminals 106A. Each of the plurality of terminals 106A includes: the first object map generation unit 6A configured to calculate, using acquired image information, the object map indicating a type of an object and a position of the object; and the communication unit 9A configured to transmit the object map to the server 116. The server 116 includes: the object map database 18C storing the object maps received from the plurality of terminals 106A; and the error determination unit 19C configured to determine correctness of the type of the object included in the received object map by a majority decision based on information stored in the object map database 18C, and notify the terminal from which the object map is transmitted of the determination. Therefore, by comparing an inference result of a movable object in one terminal with a majority decision inference result of the movable object in a plurality of other terminals, the inference error of the movable object in the one terminal can be efficiently detected.

For example, in the first embodiment, the inference error of the movable object is detected by the communication between the first device 101A and the second device 101B. However, in this method, not only when the inference error of the movable object occurs in the second device 101B, but also when the inference error of the movable object occurs in the first device 101A, the inference error of the movable object in the second device 101B is detected. Therefore, it is impossible to specify the device in which the inference error of the movable object occurs. However, according to the present embodiment, this problem can be solved.

Functional block configurations in the embodiments and modifications described above are merely examples. Some functional configurations shown as separate functional blocks may be integrated, or a configuration represented by one functional block diagram may be divided into two or more functions. A part of functions of each functional block may be provided in another functional block.

The embodiments and modifications described above may be combined with each other. Although various embodiments and modifications have been described above, the invention is not limited to the embodiments and modifications. Other embodiments that are regarded within the scope of the technical idea of the invention are also included within the scope of the invention.

REFERENCE SIGN LIST

1A: first image acquisition unit
1B: second image acquisition unit
5A: first inference unit
5B: second inference unit
6A: first object map generation unit
6B: second object map generation unit
8A: first control determination unit
8B: second control determination unit
9A: first communication unit
9B: second communication unit
9C: server communication unit
10B: comparison unit
13A: first detection region information generation unit
13B: second detection region information generation unit
14A: common detection region specifying unit
15A: detection region information correction unit
16A: object map information complementation unit
17B: communication destination device abnormality determination unit
18C: object map database
19C: determination unit
20: server
101A to 105A: first device
101B to 105B: second device
106A: terminal
116: server

The invention claimed is:

1. A calculation system, comprising:
a memory storing processor executable instructions;
a first device; and
a second device,
wherein the first device includes:
a first object map generation central processing unit (CPU) configured to execute the processor executable instructions whereby the first object map generation CPU is configured to calculate, using first image information that is image information acquired by the first device, a first object map indicating a type of an object and a position of the object; and
a first communication circuit configured to transmit the first object map to the second device, and
a detection region information correction CPU configured to acquire a first detection region that is a geographical range of a subject included in the first image information at a plurality of times, and calculate the first detection region at any time; and
an object map information complementation CPU configured to calculate the first object map at any time by using the first object map at a plurality of times calculated by the first object map generation unit, and
the second device includes:
a second object map generation CPU configured to calculate, using second image information that is image information acquired by the second device, a second object map indicating a type of an object and a position of the object; and wherein the second device is configured to compare the first object map and the second object map;
a second communication circuit configured to transmit, to the first device, information indicating a second detection region that is a geographical range of a subject included in the second image information; and
wherein the first communication circuit of the first device is configured to: when receiving the second detection region from the second device, transmit to the second device, the first object map at a time related to the second detection region, calculated by the object map information complementation CPU, the first object map being information of an object included in a common region between the second detection region and the first detection region at the time related to the second detection region, which is calculated by the detection region information correction CPU; and transmit, to the second device, only information of an object included in the second detection region in the first object map.

2. The calculation system according to claim 1, wherein the first communication circuit of the first device is configured to transmit the first object map when a difference between a position indicated by position information received from the second device and a position of the object included in the first object map is within a predetermined distance.

3. The calculation system according to claim 1, wherein the first object map generation CPU and the second object map generation CPU set a movable object that is not fixed to the ground as a detection target.

4. The calculation system according to claim 1, wherein the first object map generation CPU and the second object map generation CPU are configured to calculate a type of an object by inference based on machine learning, and the second device is configured to detect an inference error by comparing the first object map and the second object map.

5. The calculation system according to claim 1, wherein
the first object map generation CPU is configured to calculate, based on a position error related to the first image information, the first object map including a position error in the position of the object,
the second object map generation CPU is configured to calculate, based on a position error related to the second image information, the second object map including a position error in the position of the object, and
the comparison circuit is configured to compare the first object map including the position error and the second object map including the position error.

6. A calculation system, comprising:
a server; and
a plurality of terminals, wherein each of the plurality of terminals includes:
an object map generation CPU configured to calculate, using acquired image information, an object map indicating a type of an object and a position of the object; and
a terminal communication circuit configured to transmit the object map to the server, and
the server includes:
an object map database storing the object map received from the plurality of terminals; and
an error determination unit configured to determine correctness of the type of the object included in the received object map by a majority decision based on information stored in the object map database, and notify the terminal from which the object map is transmitted of the determinations; and wherein:
the terminal communication circuit of a second terminal of the plurality of terminals is configured to transmit, to a first terminal of the plurality of terminals, information indicating a second detection region that is a geographical range of a subject included in the second image information, and
the first communication circuit of the first terminal is configured to transmit to the second terminal, only information of an object included in the second detection region in the first object map; and
wherein the first terminal further includes:
a detection region information correction CPU configured to acquire a first detection region that is a geographical range of a subject included in the first image information at a plurality of times, and calculate the first detection region at any time; and
an object map information complementation CPU configured to calculate the first object map at any time by using the first object map at a plurality of times calculated by the first object map generation unit; and
wherein the communication circuit of the first terminal is configured to, when receiving the second detection region from the second terminal, transmit to the second terminal, the first object map at a time related to the second detection region, calculated by the object map information complementation CPU, the first object map being information of an object included in a common region between the second detection region and the first detection region at the time related to the second detection region, which is calculated by the detection region information correction CPU.

7. A calculation method performed by a calculation system including a first device and a second device, the calculation method comprising:
by the first device,
calculating, using first image information that is image information acquired by the first device, a first object map indicating a type of an object and a position of the object; and
transmitting the first object map to the second device, and
by the second device,
calculating, using second image information that is image information acquired by the second device, a second object map indicating a type of an object and a position of the object; and
comparing the first object map and the second object map
transmitting to the first device, information indicating a second detection region that is a geographical range of a subject included in the second image information, and
further by the first device:
transmitting to the second device, only information of an object included in the second detection region in the first object map;
acquiring a first detection region that is a geographical range of a subject included in the first image information at a plurality of times, and calculating the first detection region at any time;
calculating the first object map at any time by using the first object map at a plurality of calculated times, and
when receiving the second detection region from the second device, transmitting to the second device, the first object map at a time related to the calculated second detection region, the first object map being information of an object included in a common region between the second detection region and the first detection region at the time related to the second detection region.

* * * * *